Patented June 21, 1938

2,121,367

UNITED STATES PATENT OFFICE 2,121,367

PROCESS OF CATALYTICALLY HYDROGENATING HIGH-MOLECULAR NONAROMATIC CARBOXYLIC ACIDS

Georg Schiller, Mannheim, Germany, assignor to I. G. Farbenindustrie Aktiengesellschaft, Frankfort-on-the-Main, Germany No Drawing. Application July 25, 1935, Serial No. 33,127. In Germany July 27, 1934

9 Claims. (Cl. 260—156)

The present invention relates to a new process of catalytically hydrogenating high-molecular non-aromatic carboxylic acids or materials containing the same, such as oxidation products of high-molecular non-aromatic hydrocarbons.

I have found that valuable products, especially alcohols, are obtained by subjecting high-molecular non-aromatic carboxylic acids or materials containing the same, such as oxidation products of high-molecular non-aromatic hydrocarbons, fatty acids containing at least 8 carbon atoms per molecule or the like, to a treatment with gases comprising hydrogen under superatmospheric pressure at elevated temperatures in the presence of hydrogenation catalysts comprising a metal selected from the group consisting of nickel, cobalt and copper and in the presence of basic reacting oxides of from di- to trivalent metals in amounts at least molecularly equivalent to the carboxylic acids present. The use of at least molecularly equivalent amounts of the said basic reacting oxides from di- or trivalent metals means that ½ molecular proportion of divalent or ⅓ molecular proportion of trivalent metal oxides are to be employed to one molecular proportion of the acids. Suitable basic reacting metal oxides are, for example, the oxides of calcium, strontium, barium, magnesium, zinc, cadmium and aluminium.

Suitable initial materials are those containing or consisting of non-aromatic carboxylic acids containing at least 8 carbon atoms in the molecule, such as stearic, palmitic, oleic acid, the mixtures of acids obtainable by saponifying vegetable or animal fats and oils, such as coconut oil, palm kernel oil, soy bean oil, train oil, furthermore the oxidation products from high-molecular non-aromatic hydrocarbons, preferably those obtained by oxidizing hard paraffin wax, soft paraffin wax, higher molecular non-aromatic petroleum hydocarbons, hydrogenation products of coals, tars, mineral oils and the like, in the liquid phase at elevated temperature, preferably between 100° to 200° C. by means of gases comprising oxygen, such as air, oxygen, nitrous gases or nitric acid or the like, if desired, in the presence of catalysts, such as manganese palmitate, sodium carbonate-manganese stearate, sodium palmitate-aluminium palmitate etc. Instead of high-molecular non-aromatic carboxylic acids as such, raw mixtures containing the same, for example, the crude reaction mixtures originating from the oxidation of high-molecular non-aromatic hydrocarbons which besides the acids may contain hydrocarbons, ketones, aldehydes and the like, can serve as initial materials.

The basic reacting oxides of from di- to trivalent metals presumably exert two functions, namely they neutralize the carboxylic acids present thus preventing damage of the catalysts, and furthermore they activate the nickel, cobalt or copper. While these explanations may be helpful in understanding the present invention, the latter is in no way restricted thereby. It is possible to employ the basic reacting oxides in the said proportions (calculated on the carboxylic acids to be treated) in admixture with the nickel, cobalt or copper. In this case the proportion of nickel or the like to the basic reacting metal oxide is preferably 1: 3 to 1:10. It may, however, be advantageous to apply separately the major part of the basic reacting oxides, and the nickel, cobalt or copper catalyst activated with a small amount of basic reacting metal oxide; in the latter case the major part of the basic reacting metal oxides and the activated nickel, cobalt or copper catalyst may be contacted with the materials to be hydrogenated successively or simultaneously. It is, of course, possible to add the basic reacting metal oxide and a hydrogenation catalyst not activated with such oxides separately, the activation by means of the excess of oxides over the amount necessary for neutralizing the acids being effected in the reaction vessel.

A suitable method of preparing catalysts for use in the present process consists in intimately mixing the metals (Ni, Co and/or Cu) with the basic reacting metal oxide or oxides, both components being advantageously in the form of fine powders. Another suitable method of producing the catalysts consists in precipitating together insoluble compounds, for example carbonates, of these two components from solutions containing water-soluble compounds thereof, and drying the precipitates, if desired, after washing. If the hydrogenating component is present in the catalyst in the oxidic form, it is reduced before or at the beginning of the treatment.

A further method of preparing the catalysts consists in introducing the basic reacting metal oxides into solutions or melts of nickel, cobalt or copper salts decomposable at elevated temperatures, for example the nitrates, formates and acetates of the said metals. Any other methods of producing activated catalysts may also be employed. Instead of using nickel or cobalt or copper several of these metals may be employed together and instead of using one basic metal oxide several compounds of this type may be applied.

It may be advantageous to precipitate the catalysts on carriers, for example, on diatomaceous, asbestos or other substances having a large surface area.

The hydrogenation may be carried out, for example, by passing the materials to be reduced over solidly arranged catalysts in the presence of hydrogen or by dispersing the finely divided catalysts (including the basic reacting oxides) in the starting materials and passing hydrogen through the dispersion. Dispersons of the said kind may be allowed to trickle down through a reaction tower containing filler bodies, such as Raschig rings, hydrogen being led through the tower, preferably in an upward direction.

The catalysts are very readily dispersible in the initial material which fact is perhaps due to their relatively low specific gravity. The hydrogenation may be carried out at comparatively low temperatures, for example at 180° C. The process offers the advantage of securing a smooth reduction to alcohols even while using relatively small amounts of metallic hydrogenation catalysts, for example from 1 to 2 per cent calculated on the initial material. Somewhat larger amounts of these catalysts may, of course, also be employed. If higher temperatures, for example above 350° C., are applied the alcohols formed are in part converted into hydrocarbons. Usually hydrogen pressures of from about 20 to about 300 atmospheres are suitable, but lower or higher pressures may also be chosen.

The products obtainable according to the present invention may be employed as valuable intermediates for example in the production of assistants for the textile and related industries.

The following examples will further illustrate the nature of this invention, but the invention is not restricted to these examples. The parts and percentages are by weight.

Example 1

Paraffin oil is oxidized by blowing with air at 140° C. in the presence of manganese stearate as a catalyst, a product being obtained which has the following characteristics:

| | |
|---|---|
| Acid number | 43 |
| Saponification number | 98 |
| Hydroxyl number | 11 |

750 parts of the said oxidation product and 40 parts of a catalyst containing 15 per cent of metallic cobalt and 85 per cent of magnesium oxide are heated for 24 hours at 220° C., under a hydrogen-pressure of 200 atmospheres. After removal of the catalyst a product is obtained which mainly consists of alcohols and has the following characteristics:

| | |
|---|---|
| Acid number | 0 |
| Saponification number | 17 |
| Hydroxyl number | 115 |

Example 2

Paraffin oil is oxidized by blowing with oxygen at 140° C. in the presence of calcium naphthenate as a catalyst. 200 parts of the product obtained which has the characteristics:

| | |
|---|---|
| Acid number | 48 |
| Saponification number | 120 |
| Hydroxyl number | 45 | and 12 parts of a cobalt-calcium oxide catalyst containing 30 per cent of metallic cobalt are heated for about 24 hours at 220° C. under a hydrogen-pressure of 200 atmospheres. The catalyst is removed and a product is obtained which has the following characteristics:

| | |
|---|---|
| Acid number | 3 |
| Saponification number | 36.5 |
| Hydroxyl number | 174 |
| Carbonyl number | 8.3 |

Example 3

100 parts of palmitic acid (acid number=235) are hydrogenated for 3 hours together with 10 parts of a copper-magnesium oxide-catalyst containing 15 per cent of copper at 270° C. under a hydrogen pressure of 260 atmospheres while stirring. A product is obtained which has the following characteristics:

| | |
|---|---|
| Acid number | 0 |
| Saponification number | 11 |
| Hydroxyl number | 200 |
| Carbonyl number | 0 |

Example 4

100 parts of palmitic acid are neutralized with 8 parts of magnesium oxide and the soap formed is hydrogenated for 3 hours in a stirring-autoclave at 270° C. under a hydrogen-pressure of 260 atmospheres in the presence of 6 parts of a copper-zinc oxide-manganese oxide-catalyst precipitated on diatomaceous earth and containing 20 per cent of copper. The product is freed from the catalyst; it has the following characteristics:

| | |
|---|---|
| Acid number | 1 |
| Saponification number | 37 |
| Hydroxyl number | 197 |
| Carbonyl number | 0 |

If the palmitic acid is not neutralized with magnesium oxide but otherwise treated under the same conditions as indicated above, the product obtained has the following characteristics:

| | |
|---|---|
| Acid number | 42 |
| Saponification number | 107 |
| Hydroxyl number — In the unsaponifiable matter which amounts to 48.6 per cent | 216 |
| Carbonyl number — In the unsaponifiable matter which amounts to 48.6 per cent | 3 |

Example 5

150 parts of an oxidation product obtained by the oxidation of Diesel oil (acid number=48, saponification number=107) are hydrogenated for one hour in a stirring-autoclave at 270° C. under a hydrogen pressure of 270 atmospheres in the presence of 6 per cent of a copper-magnesium oxide-catalyst containing 15 per cent of copper. A product is obtained having the following characteristics:

| | |
|---|---|
| Acid number | 0 |
| Saponification number | 14 |
| Hydroxyl number | 126 |
| Carbonyl number | 3 |

What I claim is:—

1. The process of producing alcohols by catalytic hydrogenation of materials containing a substantial amount of non-aromatic carboxylic acids containing at least 8 carbon atoms per molecule, which comprises treating the said materials at a temperature sufficiently elevated to commence the reaction under superatmospheric pressure of at least 20 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount at least molecularly equivalent to the said carboxylic acids present.

2. The process of producing alcohols by catalytic hydrogenation of materials containing a substantial amount of non-aromatic carboxylic acids containing at least 8 carbon atoms per molecule, which comprises treating the said materials at a temperature between about 180° C. and about 350° C. under superatmospheric pressure of at least 20 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount at least molecularly equivalent to the said carboxylic acids present.

3. The process of producing alcohols by catalytic hydrogenation of materials containing a substantial amount of non-aromatic carboxylic acids containing at least 8 carbon atoms per molecule, which comprises treating the said materials at a temperature sufficiently elevated to commence the reaction under a pressure of from about 20 to about 200 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount at least molecularly equivalent to the said carboxylic acids present.

4. The process of producing alcohols by catalytic hydrogenation of materials containing a substantial amount of non-aromatic carboxylic acids containing at least 8 carbon atoms per molecule, which comprises treating the said materials at a temperature between about 180° C. and about 350° C. under a pressure of from about 20 to about 200 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount at least molecularly equivalent to the said carboxylic acids present.

5. The process of producing alcohols by catalytic hydrogenation of materials containing a substantial amount of non-aromatic carboxylic acids containing at least 8 carbon atoms in the molecule and being free from low molecular acids of this type which comprises neutralizing the said materials with a basic reacting oxide of a metal selected from the group consisting of di- and trivalent metals and treating the neutralized materials at a temperature sufficiently elevated to commence the reaction under a superatmospheric pressure of at least 20 atmospheres with a gas essentially comprising hydrogen in the presence of a hydrogenation catalyst essentially comprising a metal selected from the group consisting of nickel, cobalt and copper.

6. The process of producing alcohols by catalytic hydrogenation of materials containing a substantial amount of non-aromatic carboxylic acids containing at least 8 carbon atoms in the molecule, which comprises treating an oxidation product from a high-molecular non-aromatic hydrocarbon material at an elevated temperature under superatmospheric pressure of at least 20 atmospheres with a gas essentially comprising hydrogen in the presence of a hydrogenation catalyst comprising essentially a metal selected from the group consisting of nickel, cobalt and copper and in the presence of a basic reacting oxide of a metal selected from the group consisting of di- and trivalent metals in an amount at least molecularly equivalent to the said carboxylic acids present.

7. The process of producing alcohols by catalytic hydrogenation of materials containing a substantial amount of non-aromatic carboxylic acids containing at least 8 carbon atoms per molecule, which comprises treating the said materials at a temperature sufficiently elevated to commence the reaction under a pressure of from about 20 to about 300 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount at least molecularly equivalent to the said carboxylic acids present.

8. The process of producing alcohols by catalytic hydrogenation of materials containing a substantial amount of non-aromatic carboxylic acids containing at least 8 carbon atoms per molecule, which comprises treating the said materials at a temperature sufficiently elevated to commence the reaction under a pressure of from about 20 to about 300 atmospheres with a gas essentially comprising hydrogen in the presence of a hydrogenation catalyst comprising essentially a metal selected from the group consisting of nickel, cobalt and copper and in the presence of magnesium oxide in an amount at least molecularly equivalent to the said carboxylic acids present.

9. The process of producing alcohols by catalytic hydrogenation of materials containing a substantial amount of non-aromatic carboxylic acids containing at least 8 carbon atoms per molecule, which comprises treating the said materials at a temperature sufficiently elevated to commence the reaction under a pressure of from about 20 to about 300 atmospheres with a gas essentially comprising hydrogen in the presence of a hydrogenation catalyst comprising essentially a metal selected from the group consisting of nickel, cobalt and copper and in the presence of a basic reacting oxide of from a di- to a trivalent metal in an amount substantially equivalent to the said carboxylic acids present.

GEORG SCHILLER.